United States Patent [19]

Amir

[11] Patent Number: 4,790,062

[45] Date of Patent: Dec. 13, 1988

[54] APPARATUS FOR STRIPPING AN ELECTRICAL CONDUCTOR

[76] Inventor: Shlomo Amir, 106 Machanayim Street, Tel-Aviv, Israel

[21] Appl. No.: 31,761

[22] Filed: Mar. 30, 1987

[30] Foreign Application Priority Data

Apr. 4, 1986 [IL] Israel .................................... 78420

[51] Int. Cl.$^4$ ........................................... H01R 43/04
[52] U.S. Cl. ................................................. 29/564.4
[58] Field of Search ............... 29/564.4, 33 M, 33 F, 29/566.1, 566.3, 566.2, 748; 81/9.51

[56] References Cited

U.S. PATENT DOCUMENTS

| | | | |
|---|---|---|---|
| 2,954,599 | 10/1960 | Cootes et al. | 29/33 M |
| 4,380,111 | 4/1983 | Galloup et al. | 29/564.4 |
| 4,506,566 | 3/1985 | Schmid | 29/33 M |
| 4,554,725 | 11/1985 | Over et al. | 29/564.4 |

*Primary Examiner*—William R. Briggs
*Attorney, Agent, or Firm*—Benjamin J. Barish

[57] ABSTRACT

Apparatus for stripping the insulation from the end of an electrical conductor, comprises a pair of clamping jaws for clamping the electrical conductor therebetween; a pair of cutting blades mounted to one side of the clamping jaws for cutting the insulation while the conductor is clamped by the clamping jaws; a drive for driving the clamping jaws and cutting blades; and displacing means driven by the drive for effecting relative movement between the clamping jaws and cutting blades in order to strip the cut insulation from the ends of the conductor. The pair of cutting blades are carried by a support pivotably mounted with respect to the clamping jaws. The displacing means pivots the cutting blades support away from the clamping jaws to strip the cut insulation from the end of the conductor.

19 Claims, 4 Drawing Sheets

APPARATUS FOR STRIPPING AN ELECTRICAL CONDUCTOR

BACKGROUND OF THE INVENTION

The present invention relates to apparatus for stripping the end of an electrical conductor before crimping a terminal thereon. The invention also relates to apparatus for both stripping the end off an electrical conductor and for crimping a terminal thereon.

When attaching terminals to electrical conductors, the insulation is first stripped off the end of the electrical conductor, and the terminal is attached to the stripped end by a crimping device. Machines are known for performing both the stripping and the crimping operations. Such machines comprise a pair of clamping jaws for clamping the electrical conductor, a pair of cutting blades for cutting the insulation while the conductor is clamped, displacing means for effecting relative movement between the clamping jaws and cutting blades in order to strip the cut insulation from the end of the conductor, and a crimping device for crimping the terminal on the stripped end of the conductor. In the presently available machines, the cutting blades are generally moved in a linear direction parallel to the axis of the conductor clamped between the clamping jaws in order to strip the cut insulation from the end of the conductor. I have found such an arrangement not to be entirely satisfactory because the cutting blades, when moved in such linear direction away from the clamping jaws, tends to interfere with the crimping device when that device is operated. Moreover, these known arrangements limit the space available in the machine for other devices, such as for straightening the terminal, which devices are sometimes necessary or desirable.

An object of the present invention is to provide a stripping apparatus having advantages in the above respects.

BRIEF SUMMARY OF THE INVENTION

According to the present invention, there is provided apparatus for stripping the insulation from the end of an electrical conductor, comprising a pair of clamping jaws for clamping the electrical conductor therebetween, a pair of cutting blades mounted to one side of the clamping jaws for cutting the insulation while the conductor is clamped by the clamping jaws, a drive for driving the clamping jaws and cutting blades, and displacing means driven by the drive for effecting relative movement between the clamping jaws and cutting blades in order to strip the cut insulation from the ends of the conductor. The pair of cutting blades are carried by a support pivotably mounted with respect to the clamping jaws. The displacing means pivots the cutting blades support away from the clamping jaws to strip the cut insulation from the end of the conductor.

It has been found that such an arrangement provides a number of advantages over the existing arrangements wherein the cutting blades are moved in a linear path away from the clamping jaws. Thus, such an arrangement better accomodates the crimping device, when such a device is used, and is less likely to interfere with its operation. Moreover, the novel arrangement also provides more space for accomodating other devices, such as for straightening the terminal, when such devices are desired to be included.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
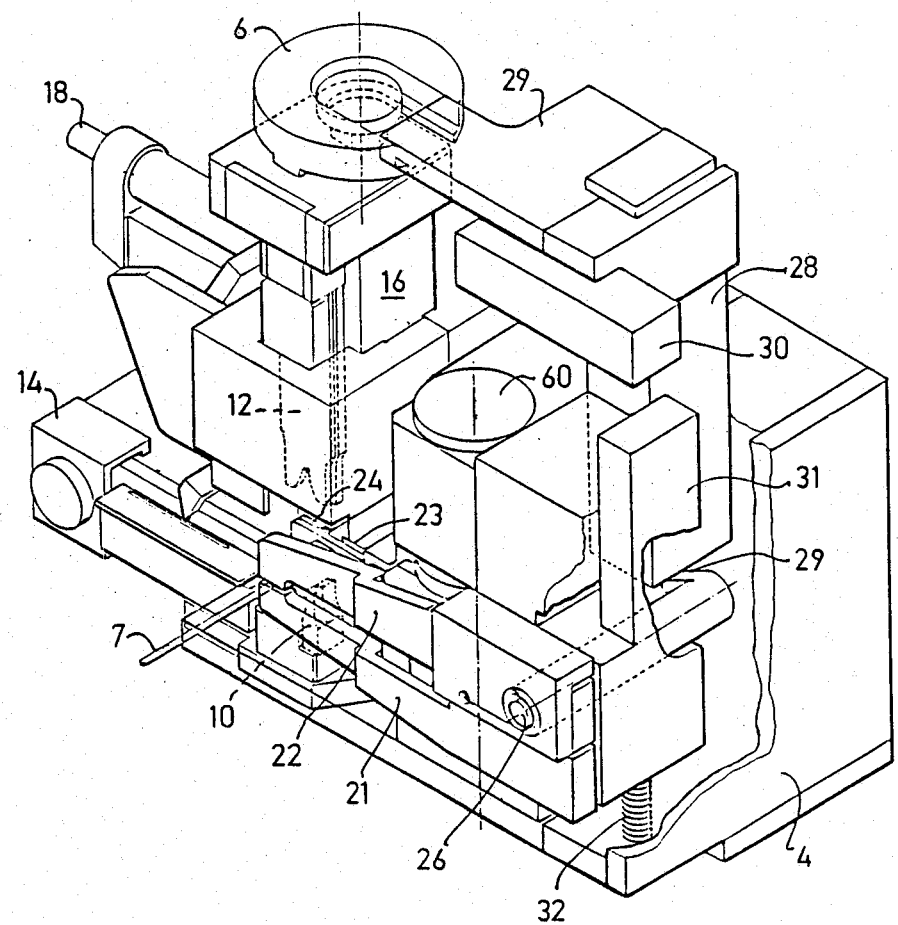
FIG. 1 is a three-dimensional view illustrating one form of apparatus constructed in accordance with the present invention.

The apparatus illustrated in the drawings is designed for first stripping the insulation from the ends of electrical conductors inserted individually into the apparatus, and then crimping a terminal onto the stripped end of each electrical conductor.

Figure 2:
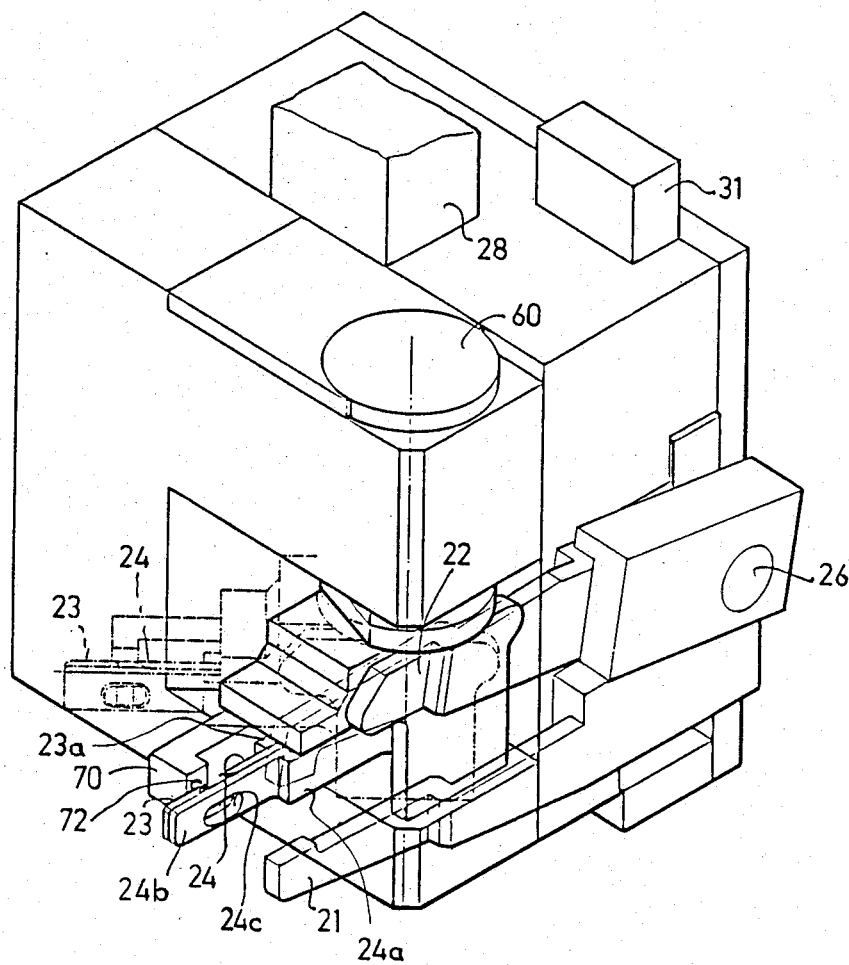
FIG. 2 is a three-dimensional view of the apparatus of FIG. 2 but viewed from a different side.
Figure 3:
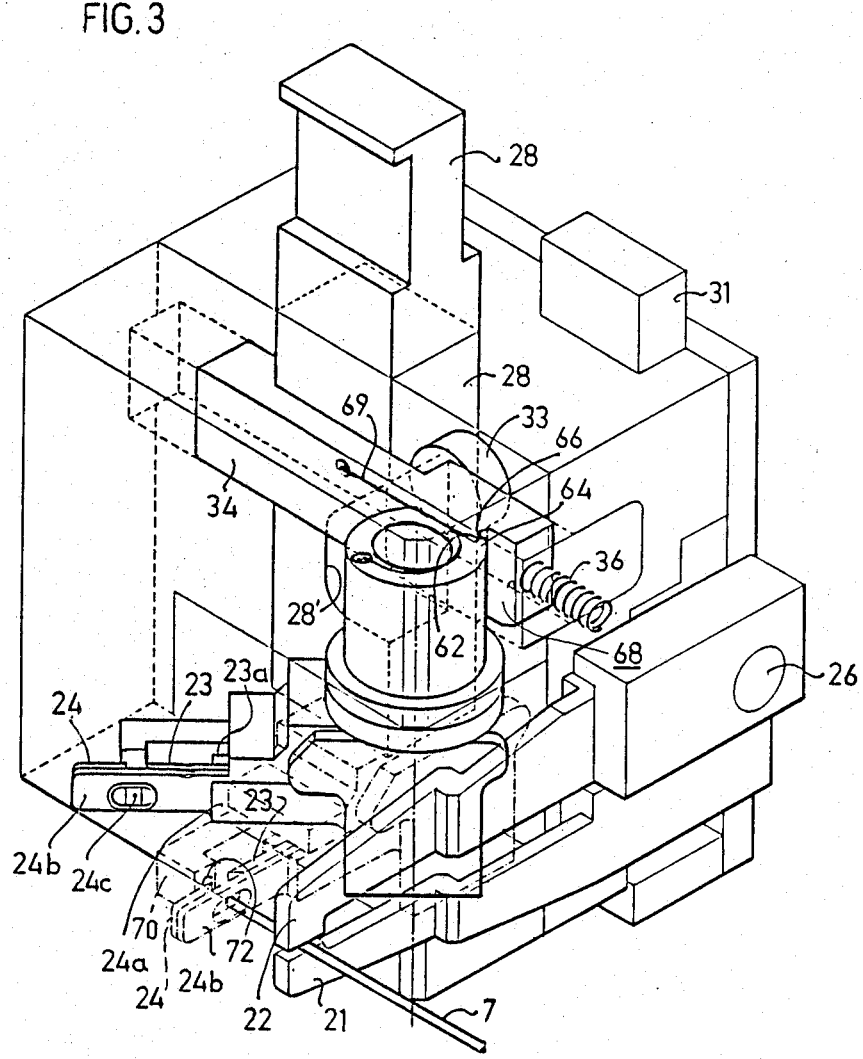
FIG. 3 is another view of the apparatus of FIG. 1 viewed from the same side as FIG. 2 but with parts removed to better illustrate the structure.

The illustrated apparatus comprises a horizontal base plate 2 carrying an end wall 4 at one end. The stripping and crimping devices are mounted on base plate 2 and are driven by a drive including a horizontal plate 6 coupled to a press (not shown) reciprocated through a downward forward stroke and an upward return stroke. The electrical conductors, one of which is shown at 7 in FIGS. 2 and 3, are individually fed into the apparatus. As each conductor is fed, the stripping components of the illustrated machine are first actuated in order to strip the electrical insulation from the end of the conductor, and then the crimping components of the machine are actuated in order to crimp an electrical terminal onto the stripped end of the conductor.

The crimping parts of the machine are substantially the same as in existing machines. They include a lower fixed anvil 10 and an upper crimping plate 12, both shown in broken lines in FIG. 1. Crimping plate 12 is actuated at the proper time of the machine cycle to crimp a terminal fed in the form of a strip of such terminals by a feeder mechanism 14. Crimping plate 12 is driven, downwardly to effect the crimping operation and then upwardly to its normal position, by a ram 16 coupled to plate 6 of the drive, which plate is in turn coupled to a press (not shown) as indicated earlier. FIG. 1 also illustrates, at 18, parts of the transmission for feeding the terminals.

Since the foregoing parts of the crimping mechanism are known, further details of their construction and operation are not illustrated in the drawings. The remainder of the description, therefore, will be substantially confined to the structure and operation of the stripping mechanism for stripping the ends of the electrical conductors, and also the synchronized operation of the stripping mechanism with the crimping mechanism, particularly the driving of crimping plate 12 by the drive including ram 16 and plate 6 coupled to the press.

The stripping components of the illustrated apparatus comprise a pair of clamping jaws 21, 22 for clamping the electrical conductor 7, and a pair of cutting blades 23, 24 for cutting the insulation while the conductor is clamped between the clamping jaws 21, 22. In the apparatus illustrated, the cutting blades 23, 24 are carried by a support pivotably mounted with respect to the clamping jaws, which support is pivoted away from the clamping jaws after such jaws have clamped the wire, in order to strip the cut insulation from the end of the wire.

More particularly, the lower clamping jaw 21 is fixed with respect to the machine base 2, and the upper clamping jaw 22 is pivotably mounted by a pivot pin 26 towards and away from jaw 21. The pivoting of jaw 22 is effected by a drive bar 28 engageable with a projection 29 carried by pivot pin 26. Drive bar 28 is driven along a first axis, namely the vertical axis in the described embodiment, by a plate 29 carried by plate 6 coupled to the drive press.

After the clamping jaws 21, 22 have been actuated to clamp the conductor 6 between them, the cutting blades 23, 24 are actuated to move them towards each other in order to engage and cut the insulation of the clamped conductor; and then the cutting blades are pivoted away from the clamping jaws in order to strip the cut insulation from the end of the electrical conductor. Following this, the two clamping jaws are driven downwardly by the engagement of horizontal bar 30 with a vertical bar 31, which latter bar drives pivot pin 25 downwardly against a spring 32, to move the stripped end of the conductor 7 over the terminal. The crimping plate 12 is then actuated in order to crimp a terminal onto the stripped end of the electrical conductor.

Figure 4:
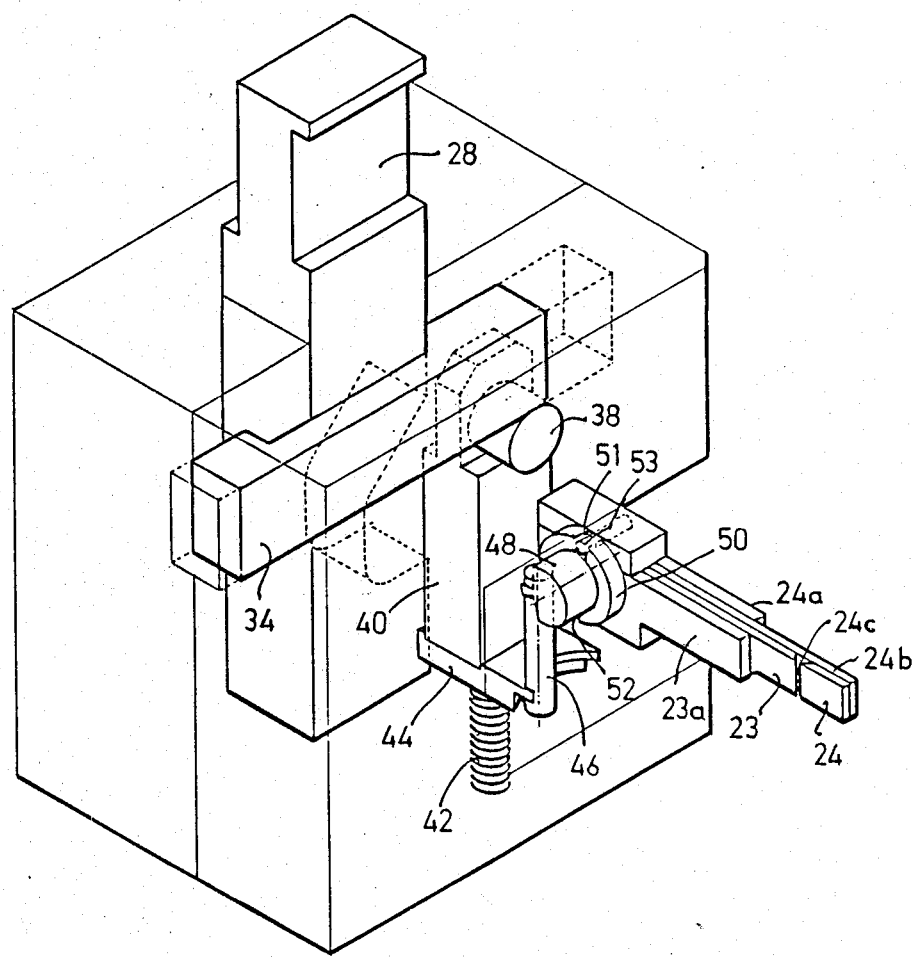
FIG. 4 is a three-dimensional view of parts of the apparatus of FIG. 1 in order to better show the drive for the cutting blades.

The structure of the cutting blades 23, 24, and the manner in which they are first moved toward each other to cut the insulation and then pivoted together away from the clamping jaws 21, 22 in order to strip the insulation from the end of the conductor, are best seen in FIGS. 2, 3 and 4.

As shown particularly in FIG. 3, drive bar 28 is formed with a cam surface 30 which engages a roller 33 carried by a slide bar 34. When drive bar 28 is in its normal raised position, roller 33 is received within the low portion of cam surface 28', such that slide bar 34 is in its leftmost position (FIG. 3); it is urged to this position by a spring schematically shown in 36. When drive bar 28 is driven downwardly, roller 33 moves along cam surface 28' to its high portion, to thereby move slide bar 34 rightwardly in the horizontal direction while compressing spring 36.

As shown in FIG. 4, the undersurface of the horizontal slide bar 34 engages a cam member 38 carried by coupling bar 40. This lower surface of slide bar 34 is slightly inclined such that the rightward movement of the slide bar causes bar 40 to move downwardly a small amount against the action of a spring, schematically shown at 42. Bar 40 is coupled, by an extension 44, and a rod 46, to a cylindrical boss 48 on a disc 50 formed with a pair of notches 51, 52 at its opposite sides. Each notch receives a pin coupled to one of the two cutting blades 23, 24. FIG. 4 illustrates only pin 53 in notch 51, this pin being fixed to a pair of carrier members 24a, 24b carrying cutting blade 24; whereas the corresponding pin received within notch 52 is fixed to a carrier member 23a carrying by blade 23. Carrier member 24b for cutting blade 24 is formed with an elongated opening 24c, as best seen in FIGS. 2 and 3, for guiding the electrical conductor when inserted between the clamping jaws 21, 22 and the cutting blades 23, 24.

It will thus be seen, particularly from FIG. 4, that when drive bar 28 is driven downwardly and slide bar 34 is driven horizontally (rightwardly, FIG. 4) thereby, bar 40 is driven a small distance downwardly by the slight incline in the underface of slide bar 34 to rotate disc 50 (counter clockwise FIG. 4) sufficient to move the two cutting blades 23, 24 towards each other so as to cut into the insulation of the wire 7 inserted via opening 24c between the cutting blades. This movement of the cutting blades severs the insulation.

After the cutting blades 23, 24 have been moved to sever the insulation, they are then pivoted together away from the clamping jaws 21, 22 in order to strip the insulation from the end of the electrical conductor. The mechanism for so pivoting the cutting blades is seen in FIGS. 2 and 3.

As shown particularly in FIG. 3, the two cutting blades 23, 24 are carried by a shaft 60 which is pivotably mounted about the vertical axis at one side of the two clamping jaws 21, 22. Shaft 60 is formed at one side with a cut-out 62 defining a shoulder 64. This shoulder is engageable by a shoulder 66 defined by a cut-out 68 formed in the end of the horizontal slide block 34. Pivotable shaft 60 is normally urged to the position illustrated in FIG. 3 under the action of a spring, schematically shown at 69 in FIG. 3, but upon the movement of slide bar 34 (rightwardly, FIG. 3), its shoulder 66 engages shoulder 64 of shaft 60 so as to pivot the shaft (clockwise FIG. 3) to thereby pivot the two cutting blades 23, 24 also clockwise, i.e. away from the clamping jaws 21, 22. FIG. 3 illustrates the pivoted position of the cutting blades 23, 24 in full lines, and their normal position in broken lines.

The illustrated apparatus further includes a stop 70 (FIGS. 2 and 3) in alignment with the clamping jaws 21, 22 and the cutting blades 23, 24 in their normal position, the stop being on the side of the cutting blades opposite to the clamping jaws. Stop 70 is located so as to be engageable by the electrical conductor 7 when inserted between the clamping jaws and the cutting blades, and thereby fixes the position of the electrical conductor. In addition, stop 70 includes an electrical switch, schematically indicated at 72, which when engaged by the electrical conductor, actuates the press (not shown) to initiate a cycle of operation.

The apparatus illustrated in the drawings operates as follows:

An electrical conductor 7 having a covering of insulation is inserted (manually or by machine) between the clamping jaws 21, 22, and the cutting blades 23, 24, until it engages electrical switch 72 carried by stop 70. As soon as this occurs, the press (not shown) is actuated to drive plate 6, coupled to the press, through a downward (forward) stroke.

At the beginning of the downward stroke, drive bar 28 is driven downwardly and engages projection 29 of pivot pin 26 (FIG. 1) to pivot the upper clamping jaw 22 downwardly towards the fixed clamping jaw 21, and thereby to firmly clamp the electrical wire 7 between the two jaws.

Drive bar 28 also drives slide bar 38 in the horizontal direction (rightwardly, FIG. 3) against the action of spring 36. This movement is effected by roller 33 carried by the slide bar moving within cam surface 28' of the drive bar.

During this initial movement of slide bar 34, it moves the two cutting blades 23, 24 towards each other. This movement of the cutting blades is effected by the lower inclined surface of slide bar 34 engaging cam roller 38 (FIG. 4) which moves bar 40 downwardly to rotate disc 48 (counter clockwise, FIG. 4), as described above.

After the cutting blades 23, 24 have been moved toward each other to engage and cut the insulation at the end of the electrical conductor 7, the continued downward movement of drive bar 28 moves slide bar 34 further (rightwardly, FIG. 3) to pivot shaft 60 (clockwise, FIG. 3) by virtue of the engagement of shoulder 66 of the slide bar with shoulder 64 of the shaft. This pivoting of shaft 60 is effected against the action of spring 69 and pivots the two cutting blades, 23, 24 away from the clamping jaws 21, 22, to thereby strip the insulation from the end of the electrical conductor.

After the cutting blades 23, 24 have thus stripped away the insulation from the end of the electrical conductor, bar 30 (FIG. 1) engages bar 29 to move pivot pin 26 and the two clamping jaws 21, 22 downwardly, against spring 32, to move the stripped end of the conductor 7, clamped by jaws 21, 22, stripped end of the conductor 7, clamped by jaws 21, 22, over a terminal of the terminal strip fed by terminal feeder 14. Crimping plate 12 is then driven downwardly by ram 16, coupled to the press by plate 6, and presses the terminal against the stripped end of the electrical conductor and the lower anvil 10, to thereby crimp the terminal onto the conductor.

The above-described clamping, cutting and stripping operations occupy about one-half of the downward (forward) stroke of the press, whereas the crimping operation is performed during the second half of the downward stroke. The above described return springs return their respective parts during the return stroke of the press.

While the invention has been described with respect to one preferred embodiment, it will be appreciated that many variations, modifications and other applications of the invention may be made.

What is claimed is:

1. Apparatus for stripping the insulation from the end of an electrical conductor, comprising: a pair of clamping jaws for clamping the electrical conductor therebetween; a pair of cutting blades mounted to one side of the clamping jaws for cutting the insulation while the conductor is clamped by the clamping jaws; a drive for driving said clamping jaws and cutting blades; and displacing means driven by said drive for effecting relative movement between said clamping jaws and cutting blades in order to strip the cut insulation from the ends of the conductor; said pair of cutting blades being carried by a support pivotably mounted with respect to said, clamping jaws; said displacing means pivoting said cutting blades support away from the clamping jaws to strip the cut insulation from the end of the conductor.

2. The apparatus according to claim 1, wherein said displacing means comprises: a drive bar driven by said drive along a first axis; a slide bar driven by said drive bar along a second axis perpendicular to said first axis; a pivotable shaft carrying said cutting blades and pivotable about said first axis; and a coupling between said slide bar and said pivotable shaft for pivoting same and the cutting blades about said first axis when the slide bar is driven along said second axis.

3. The apparatus according to claim 2, wherein said coupling means comprises a first shoulder formed on said slide bar engageable with a second shoulder formed on said pivotable shaft.

4. The apparatus according to claim 3, wherein said first shoulder is defined by a cut-out at the end of said slide bar engageable with a cut-out formed in said pivotable shaft defining said second shoulder.

5. The apparatus according to claim 3, further including a first spring urging said slide bar to a normal position, which spring is compressed when the slide bar is driven by said drive bar; and a second spring urging said pivotable shaft to a normal position, which spring is compressed when the pivotable shaft is pivoted by said slide bar.

6. The apparatus according to claim 3, wherein said cutting blades comprise a pair of blades located on opposite sides of the conductor and moved by said slide bar towards each other to engage and cut the conductor insulation, said pair of blades being coupled by a coupling to said slide bar so as to be moved towards each other to engage and cut the conductor insulation before the cutting blades are pivoted away from said clamping jaws to strip the cut insulation from the end of the conductor.

7. The apparatus according to claim 6, wherein the coupling of said cutting blades to said slide bar includes a cam member engageable with the underface of said slide bar and carried by a coupling bar driven along said first axis to move the cutting blades towards each other when said slide bar is driven by said drive bar.

8. The apparatus according to claim 7, wherein said coupling bar is coupled to a rotatable disc to rotate same when said coupling bar is driven along said first axis; said rotatable disc including a pair of notches on opposite sides thereof each receiving a pin, each pin being coupled to one of said cutting blades such that both blades are moved toward each other when the coupling bar is driven in one direction along said first axis, and are moved away from each other when the coupling bar is driven in the opposite direction along said first axis.

9. The apparatus according to claim 2, wherein said clamping jaws comprise a fixed jaw, a pivotable jaw, and a coupling between said drive bar and said pivotable jaw moving same towards said fixed jaw when said drive bar is driven along said first axis.

10. The apparatus according to claim 2, wherein said first axis is the vertical axis, and said second axis is the horizontal axis.

11. The apparatus according to claim 2, further including a stop aligned with said clamping jaws and said cutting blades in their normal positions, said stop being disposed on the side of said cutting blades opposite to said clamping jaws so as to be engageable by the conductor when inserted between said clamping jaws and cutting blades to limit the position of the inserted conductor; said stop including an electrical switch which, when engaged by said conductor, actuates said drive to drive the drive bar along said first axis.

12. The apparatus according to claim 2, further including a crimping device also actuated by said drive bar to crimp a terminal on the conductor after the cutting blades have been pivoted away from the clamping jaws by the drive bar.

13. The apparatus according to claim 12, wherein said drive bar, during the first half of its forward stroke, closes said clamping jaws, closes said cutting blades out of the way to strip the insulation from the conductor, and then lowers said clamping jaws and stripped conductor onto a terminal; and during the remainder of its forward stroke, actuates said crimping device to crimp the terminal on the stripped end of the conductor.

14. Apparatus for stripping the insulation from the end of an electrical conductor, comprising: a pair of clamping jaws for clamping the electrical conductor therebetween; a pair of cutting blades mounted to one side of the clamping jaws for cutting the insulation while the conductor is clamped by the clamping jaws; a drive for driving said clamping jaws and cutting blades; displacing means driven by said drive for effecting relative movement between said clamping jaws and cutting blades in order to strip the cut insulation from the ends of the conductor; said pair of cutting blades being carried by a support pivotably mounted with respect to said clamping jaws; said displacing means pivoting said cutting blades support away from the clamping jaws to strip the cut insulation from the end of the conductor; and a crimping device also actuated by said drive to crimp a terminal on the conductor after the cutting blades have been pivoted away from the clamping jaws by the drive.

15. The apparatus according to claim 14, wherein said drive, during the first half of its forward stroke, closes said clamping jaws, closes said cutting blades out of the way to strip the insulation from the conductor, and then lowers said clamping jaws and stripped conductor onto a terminal; and during the remainder of its forward stroke, actuates said crimping device to crimp the terminal on the stripped end of the conductor.

16. The apparatus according to claim 14, wherein said displacing means comprises: a drive bar driven by said drive along a first axis; a slide bar driven by said drive bar along a second axis perpendicular to said first axis; a pivotable shaft carrying said cutting blades and pivotable about said first axis; and a coupling between said slide bar and said pivotable shaft for pivoting same and the cutting blades about said first axis when the slide bar is driven along said second axis.

17. The apparatus according to claim 16, wherein said clamping jaws comprise a fixed jaw, a pivotable jaw, and a coupling between said drive bar and said pivotable jaw moving same towards said fixed jaw when said drive bar is driven along said first axis.

18. The apparatus according to claim 16, wherein said first axis is the vertical axis, and said second axis is the horizontal axis.

19. The apparatus according to claim 16, further including a stop aligned with said clamping jaws and said cutting blades in their normal positions, said stop being disposed on the side of said cutting blades opposite to said clamping jaws so as to be engageable by the conductor when inserted between said clamping jaws and cutting blades to limit the position of the inserted conductor; said stop including an electrical switch which, when engaged by said conductor, actuates said drive to drive the drive bar along said first axis.

* * * * *